United States Patent
Mahadevappa et al.

(10) Patent No.: US 11,906,445 B2
(45) Date of Patent: Feb. 20, 2024

(54) AUTOMATED DEFECT DETECTION FOR WIRE ROPE USING IMAGE PROCESSING TECHNIQUES

(71) Applicant: Goodrich Corporation, Charlotte, NC (US)

(72) Inventors: Basavaraja Kotyal Mahadevappa, Karnataka (IN); Nitin Kumar Goyal, Karnataka (IN); Shyam Sundar S. Iyer, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 116 days.

(21) Appl. No.: 16/211,339

(22) Filed: Dec. 6, 2018

(65) Prior Publication Data

US 2020/0118259 A1   Apr. 16, 2020

(30) Foreign Application Priority Data

Oct. 10, 2018   (IN) .............................. 201811038485

(51) Int. Cl.
*G01N 21/952* (2006.01)
*G06T 7/00* (2017.01)
*D07B 1/14* (2006.01)

(52) U.S. Cl.
CPC .......... *G01N 21/952* (2013.01); *G06T 7/001* (2013.01); *D07B 1/145* (2013.01); *G06T 2207/30136* (2013.01)

(58) Field of Classification Search
CPC .................. B66B 7/1238; D07B 1/145; D07B 2301/5577; G01N 2021/8887;
(Continued)

(56) References Cited

U.S. PATENT DOCUMENTS 6,167,150 A * 12/2000 Michael ............... G06K 9/4638
348/125
8,526,706 B2   9/2013 Verret
(Continued)

FOREIGN PATENT DOCUMENTS

CN   106815831 A   6/2017
CN   106841381 A   6/2017
(Continued)

OTHER PUBLICATIONS

Extended European Search Report for Application No. 19202237.4-1230, dated Mar. 9, 2020, 9 pages.
(Continued)

*Primary Examiner* — Charles N Appiah
*Assistant Examiner* — Nicole M Louis-Fils
(74) *Attorney, Agent, or Firm* — CANTOR COLBURN LLP

(57) ABSTRACT

Provided are embodiments for performing automated defect detection for a flexible member using image processing. The techniques include monitoring, by one or more sensors, a flexible member to obtain sensor data, converting the sensor data from the one or more sensors to image data, and receiving reference image data to compare to the image data. The techniques also include determining a defect based on the comparison and threshold setting information for the flexible member, and transmitting a notification based on the defect.

10 Claims, 5 Drawing Sheets

(58) Field of Classification Search
CPC .............. G01N 21/8851; G01N 21/952; G06T 2207/30136; G06T 7/001
USPC .......................................................... 382/152
See application file for complete search history.

(56) References Cited

U.S. PATENT DOCUMENTS

| | | | |
|---|---|---|---|
| 8,718,352 B2 | 5/2014 | Winter et al. | |
| 10,551,307 B2* | 2/2020 | Kohda | G02B 6/44 |
| 2002/0038199 A1* | 3/2002 | Blemel | F17D 5/02 |
| | | | 702/183 |
| 2005/0075801 A1* | 4/2005 | Skeps | G01N 21/8901 |
| | | | 702/35 |
| 2005/0254065 A1* | 11/2005 | Stokowski | G01N 21/95684 |
| | | | 356/601 |
| 2005/0273277 A1* | 12/2005 | Ridnour | G01M 17/007 |
| | | | 702/42 |
| 2010/0027998 A1* | 2/2010 | Farley | G02B 6/3512 |
| | | | 398/59 |
| 2010/0191679 A1 | 7/2010 | Hung et al. | |
| 2010/0246974 A1* | 9/2010 | Choi | G06T 7/0004 |
| | | | 382/209 |
| 2011/0224918 A1* | 9/2011 | Floeder | G01N 21/8922 |
| | | | 702/35 |
| 2012/0174683 A1* | 7/2012 | Kemnitz | H01B 7/32 |
| | | | 73/800 |
| 2013/0058560 A1 | 3/2013 | Sobczak et al. | |
| 2017/0023347 A1* | 1/2017 | Ouellette | G01N 27/9006 |
| 2017/0089817 A1 | 3/2017 | Mozsga et al. | |
| 2017/0178308 A1* | 6/2017 | Subramaniyan | G06K 9/6214 |
| 2018/0141787 A1* | 5/2018 | Rudy | B66C 23/42 |
| 2019/0139211 A1* | 5/2019 | Morawitz | B62D 55/26 |

FOREIGN PATENT DOCUMENTS

| | | |
|---|---|---|
| CN | 107764839 A | 3/2018 |
| CN | 108226173 A | 6/2018 |
| CN | 208459294 U | 2/2019 |
| EP | 2383566 A1 | 11/2011 |
| JP | 2011011870 A | 1/2011 |
| JP | 2014157030 A | 8/2014 |
| WO | 0194922 A1 | 12/2001 |
| WO | 2012010431 A1 | 1/2012 |
| WO | 2017067651 A1 | 4/2017 |

OTHER PUBLICATIONS

EPO Official Letter for Application No. 19202237.4, dated Dec. 21, 2021, 11 pages.
Chinese Office Action for CN Application No. 201910953694.3, dated Sep. 6, 2023, pp. 1-12.

* cited by examiner

AUTOMATED DEFECT DETECTION FOR WIRE ROPE USING IMAGE PROCESSING TECHNIQUES

CROSS-REFERENCE TO RELATED APPLICATIONS

This application claims the benefit of Indian Application No. 201811038485 filed Oct. 10, 2018, which is incorporated herein by reference in its entirety.

BACKGROUND

The embodiments described herein generally relate to health monitoring and more particularly to performing automated defect detection for a wire rope using image processing techniques.

Cables and wire ropes are used across all types of industries and applications. For example, cables are used in elevators, hoists, cranes, etc. These applications include safety-critical applications such as human carrying rescue missions. These cables are required to undergo periodic inspections to determine if any defects exist. There are various types of defects that may occur for example, broken wires, broken strands, etc. due to fatigue, heaving loading, or other events. There may be a need to consistently and efficiently perform cable inspections.

BRIEF DESCRIPTION

According to an embodiment, a system for performing automated defect detection for a flexible member using image processing is provided the system includes one or more sensors configured to monitor a flexible member, an image processor configured to convert the sensor data from the one or more sensors to image data, and a processing module configured to receive reference image data. The processing module is also configured to compare the image data with the reference image data, determine a defect based on the comparison and a threshold setting information for the flexible member, and transmit a notification based on the defect.

In addition to one or more of the features described herein, or as an alternative, further embodiments include a processing module that is configured to determine the defect further comprises categorizing the defect into one or more classes based at least in part on the defect.

In addition to one or more of the features described herein, or as an alternative, further embodiments include one or more sensors that are optical fibers.

In addition to one or more of the features described herein, or as an alternative, further embodiments include a flexible member that is at least one of rope, wire, belt, and chain.

In addition to one or more of the features described herein, or as an alternative, further embodiments include using reference image data that is based on the flexible member.

In addition to one or more of the features described herein, or as an alternative, further embodiments include threshold setting information that is based on an application type for the flexible member.

In addition to one or more of the features described herein, or as an alternative, further embodiments include a processing module that is configured to determine a location of the defect of the flexible member.

In addition to one or more of the features described herein, or as an alternative, further embodiments include a notification that includes a location of the defect, a number of defects, a type of defect, or a recommendation for performing a service relating to the flexible member.

According to another embodiment, a method for performing automated defect detection for a flexible member using image processing is provided. The method includes monitoring, by one or more sensors, a flexible member to obtain sensor data, converting the sensor data from the one or more sensors to image data, and receiving reference image data to compare to the image data. The method also includes determining a defect based on the comparison and threshold setting information for the flexible member, and transmitting a notification based on the defect.

In addition to one or more of the features described herein, or as an alternative, further embodiments include determining the defect further by categorizing the defect into one or more classes based at least in part on the defect.

In addition to one or more of the features described herein, or as an alternative, further embodiments include one or more sensors that are optical fibers.

In addition to one or more of the features described herein, or as an alternative, further embodiments include a flexible member that is at least one of rope, wire, belt, and chain.

In addition to one or more of the features described herein, or as an alternative, further embodiments include reference image data that is based on the flexible member.

In addition to one or more of the features described herein, or as an alternative, further embodiments include using threshold setting information that is based on an application type for the flexible member.

In addition to one or more of the features described herein, or as an alternative, further embodiments include determining a location of the defect of the flexible member.

In addition to one or more of the features described herein, or as an alternative, further embodiments include notification including a location of the defect, a number of defects, a type of defect, or a recommendation for performing a service relating to the flexible member.

Technical effects of embodiments of the present disclosure include utilizing optical fibers, lens and image sensor and image processors to consistently and efficiently monitor the health of cables and wire ropes.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
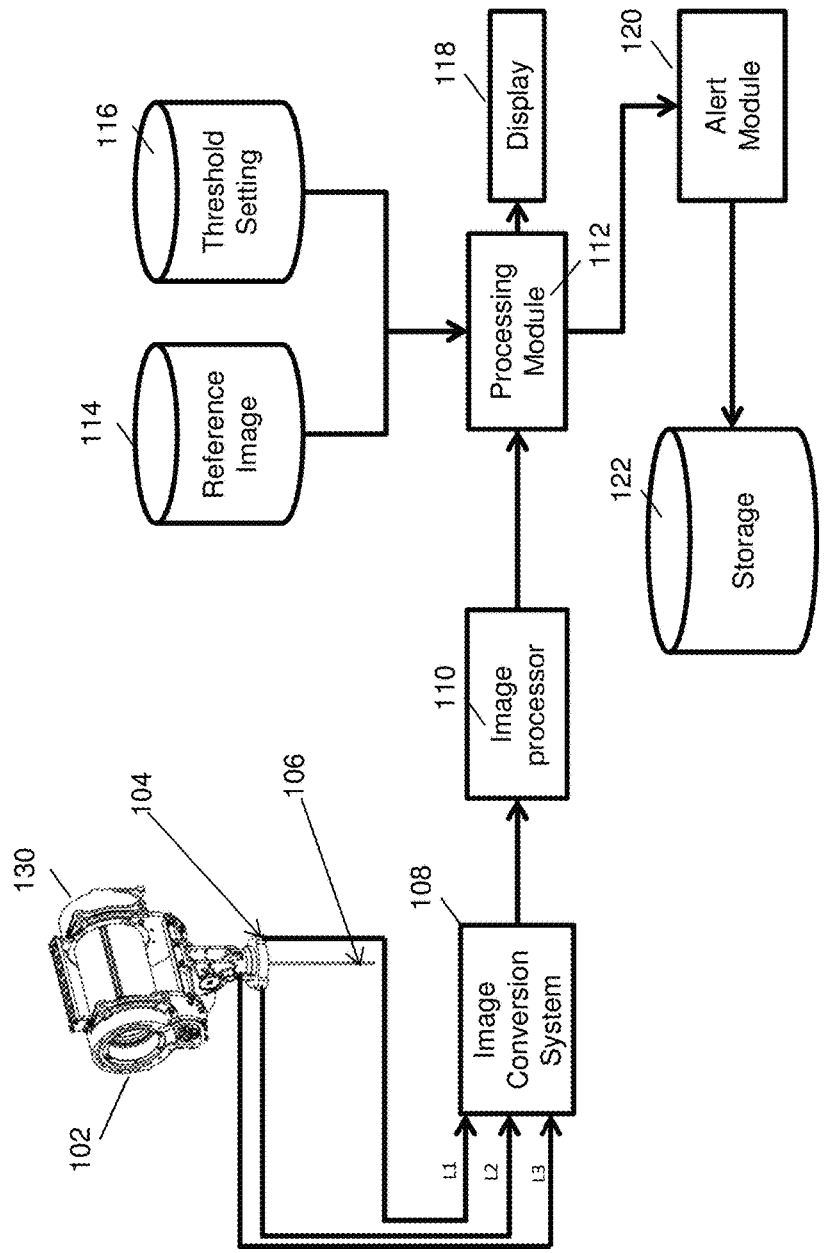
FIG. 1 depicts a system for performing automated defect detection for a wire rope using image processing techniques in accordance with one or more embodiments.

In today's environment ropes, cables, and wires (generally referred to as ropes) are used for various applications. The application the ropes are used for, can determine the frequency at which they are to be inspected and the tolerances allowed for the ropes for replacement/repair. Frequent inspections may be required for safety-critical application such as every 100 cycles or 10 hours of operation, where non-safety-critical applications can be inspected at longer intervals.

Ropes are flexible members and can be subjected to sudden loads and external disturbances, where the loading of the rope exceeds the rated load of the rope. In addition, the ropes can be subjected to repeated loads that can eventually lead to defects. These defects can include kinking, birdcaging (strand issue caused by metal-metal contact), dirt, corrosion, and a host of other factors. The ropes are inspected by trained technicians and the health of the rope can vary based on the manual inspection by different service technicians. The service technician's skill and experience can inform their assessment of the rope's health which can lead to a range of subjectivity for the same rope and/or defect.

In addition, the rope inspection cannot occur during the operation. Therefore, the device including the rope and/or flexible member may suffer downtime due to the time it takes to remove the rope and send it off for inspection. The length of the rope can vary based on their application. For example, ropes that are being used for elevator applications can range in length adding additional time to the inspection procedure. Also, different types of ropes exist which can exhibit different types of defects and the service technician must be knowledgeable of each type of rope, their tolerances, and associated defects.

The techniques described herein provide for a non-intrusive based diagnostic method for rope health monitoring by using image processing techniques. In addition, the techniques provide for a prognostic analysis of the rope or other flexible member. The techniques described herein can use one or more sensors to collect data for the rope and monitor the health of a rope where the sensors can include fiber optic sensors.

The techniques described herein also provide for defect detection by using an image processing and analysis method. Multiple algorithms can be used to analyze the rope for defects and the algorithms can be selected to best suit the application. One or more techniques include a defect detection method that classifies the type of failure and also ranks severity for operational clearance based on the application of the rope. For example, safety-critical applications such as rescue missions may require tighter threshold tolerances than non-safety critical applications.

The techniques described herein also provide for consistent defect detection in a rope or other flexible member be determining the number of defects, types of defects, the location of defects in the rope, and other information related to the rope. In one or more embodiments, the system can be updated based on the collected field failure data to improve the overall detection efficiency and correlating the defects for the different types of rope to the rope health.

In FIG. 1, a system 100 for performing automated defect detection method for a rope using image processing in accordance with one or more embodiments is provided.

The system 100 includes an image capture device 102 which is located within the control electronics of the wire rope handling device 130. The wire rope handling device 130 includes a mount 104 and configured to monitor a flexible member 106 such as a rope, belt, wire, etc. The mount 104 can be positioned near a location where the flexible member 106 is dispensed from a device that controls it. In one or more embodiments, the image capture device 102 includes one or more sensors such as optical fibers that are configured to detect sensor data from the flexible member 106 by providing a light on the surface of the flexible member 106 and analyzing the light that is reflected off of the surface of the flexible member 106. The sensors are positioned to detect the entire surface of the flexible member 106. In this non-limiting example, there are three optical fibers (L1, L2, and L3) that are used to detect the sensor data from the flexible member.

The system 100 also includes an image conversion system 108 that is configured to receive the sensor data from the image capture device 102 and convert the sensor data to image data. In a non-limiting example, the sensor data is optical light data and the light information is converted to form an image of the flexible member 106. FIG. 1 also depicts an image processor 110, where the image processor 110 is configured to enhance the image data from the conversion system 108 for further processing. The image processor 110 is configured to increase the sharpness of the image data, remove blurring, removing distortion, crop the image to a region of interest, monochrome image, etc. to proper the image for further processing and analysis for defect detection.

The processing module 112 is configured to execute a variety of algorithms for processing the image data received from the image processor 112. The processing module 110 is also configured to receive reference image data from a reference image data source 114 and threshold setting information from a threshold setting source 116. The reference image data and the threshold settings information corresponding to the type of flexible member 106 that is being monitored by the system 100 which is used to compare the current flexible member 106 to a healthy or new flexible member. The reference image information can include information such as rope type, length, diameter, strand information, the pattern of rope/strands, etc. The threshold setting information can include information such as defect types, defect classes that are mapped to the remaining life or strength of the rope. It should be understood that other types of information can be included in the reference image and threshold setting information and the information can vary for each type of rope, as well as the application the rope is being used for. For example, the same rope that is used for two different applications can have different acceptable tolerances and threshold for operations.

Responsive to performing the processing and analysis of the current image of the flexible member 106 with the reference image and the threshold setting information, the processing module 112 can transmit the results to a display 118.

In one or more embodiments, a display 118 can be included in the system 100 to display the results of the analysis. The display 118 can present graphical data, textual data, visual image of the rope, etc. The display 118 can also present notification information for an operator that indicates information such as the health of the rope including the severity of any defects that exist or a recommendation as to when the rope should be repaired/replaced.

Responsive to the results of the analysis, an alert can be transmitted to an operator or other user through the alert module 120. The alerts can include information related to the type of defect, the severity of defects of the rope, number of defects, a recommendation as to repair and/or replacement, estimated time for repair, visual of defects, etc. The results of the analysis performed by the system 100 can be stored in a storage device 122. Machine-learning can optimize the types of defects and the remaining life of the rope and recommendations provided for a defect of the rope.

Figure 2:
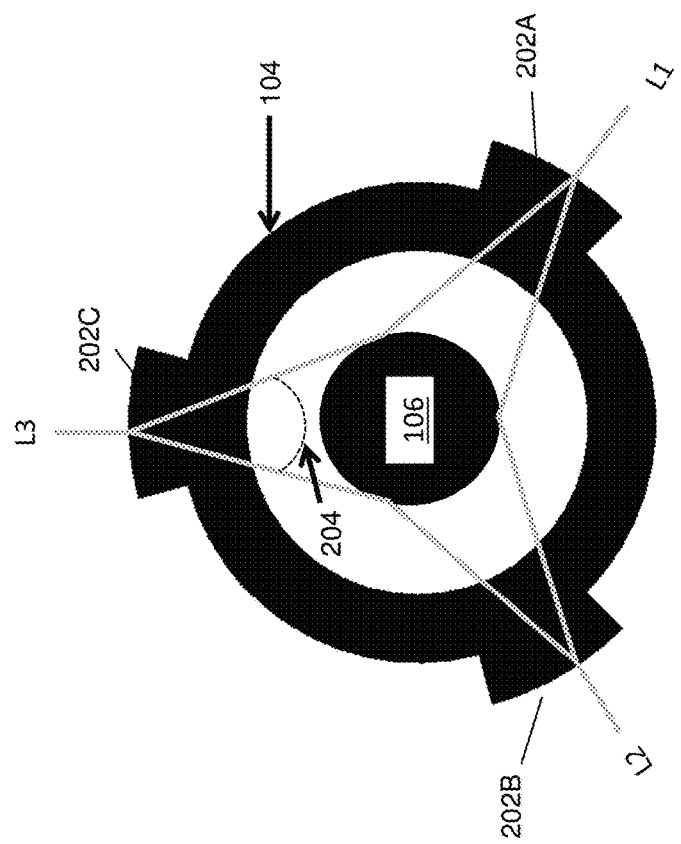
FIG. 2 depicts an arrangement of the system in accordance with one or more embodiments.
Figure 3:
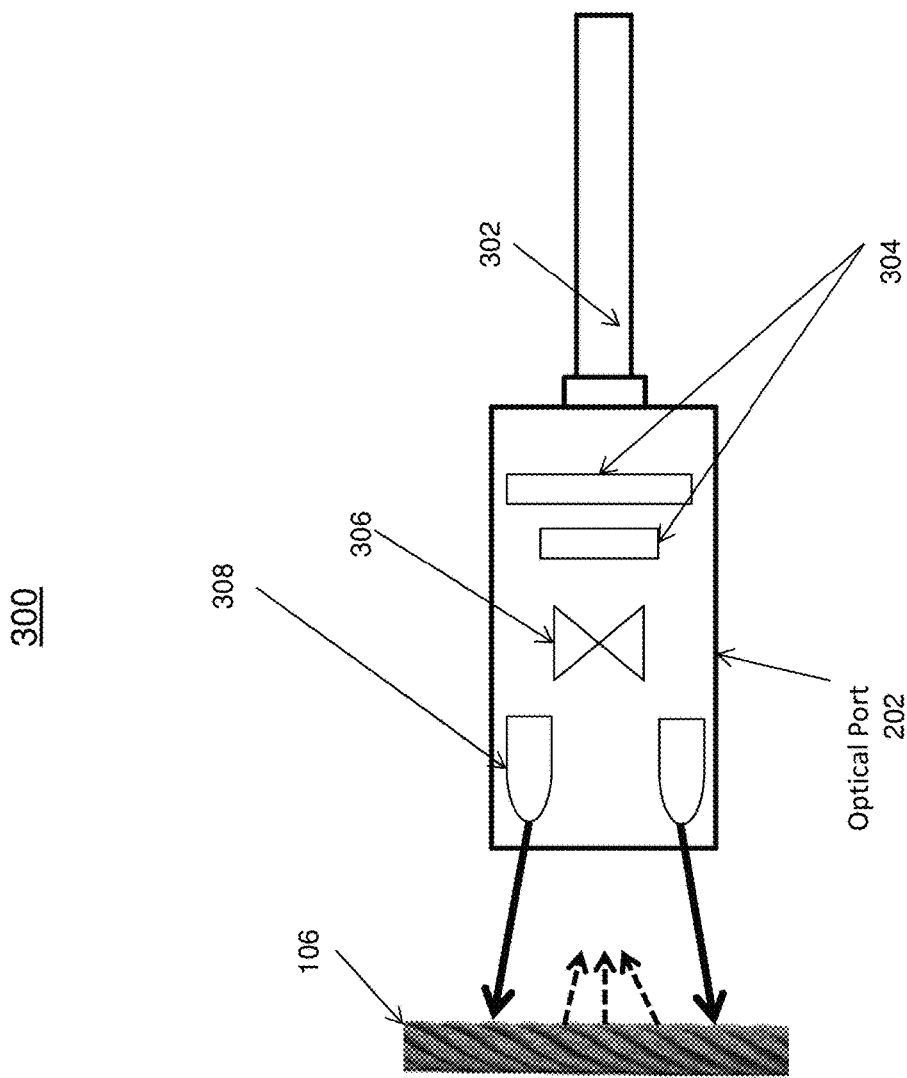
FIG. 3 depicts an arrangement of an optical port in accordance with one or more embodiments.

In FIG. 2, a view of an arrangement 200 of the mount 104 used in the system 100 in accordance with one or more embodiments is shown. The device 102 includes a mount 104 that is configured to house one or more sensors such as the optical fibers for monitoring the flexible member 106. Each optical fiber includes an optical fiber port 202A, B, and C as shown in FIG. 3. Each optical fiber port 202 is configured to transmit and receive optical signals L1, L2, and L3 and has a field of view 204 as shown in FIG. 2.

In one or more embodiments, the optical fibers and ports 202 are spaced apart at 120 degrees to cover the entire surface of the rope 106. In other embodiments, a different number of sensors, sensor types, spacing, etc. can be used to monitoring the health of the rope. For example, in the case a belt is being monitored by the system 100, one or two sensor devices can be used to monitor the rope.

Now referring to FIG. 3, an arrangement 300 of an internal view of the optical port 202 is shown. The optical port 202 is configured to be attached to the housing/mount 104 shown in FIG. 2. The optical port 202 receives the optical cable 302 that is configured to exchange optical signal data to the image processor 110 shown in FIG. 1. The optical port 202 also includes one or more filters 304 and lenses 306. The optical port 202 includes a light source 308 that is configured to transmit a light to the rope 106 and the optical port 202 is configured to receive the reflected light data that characterize the surface of the rope 106 for further processes.

Figure 4:
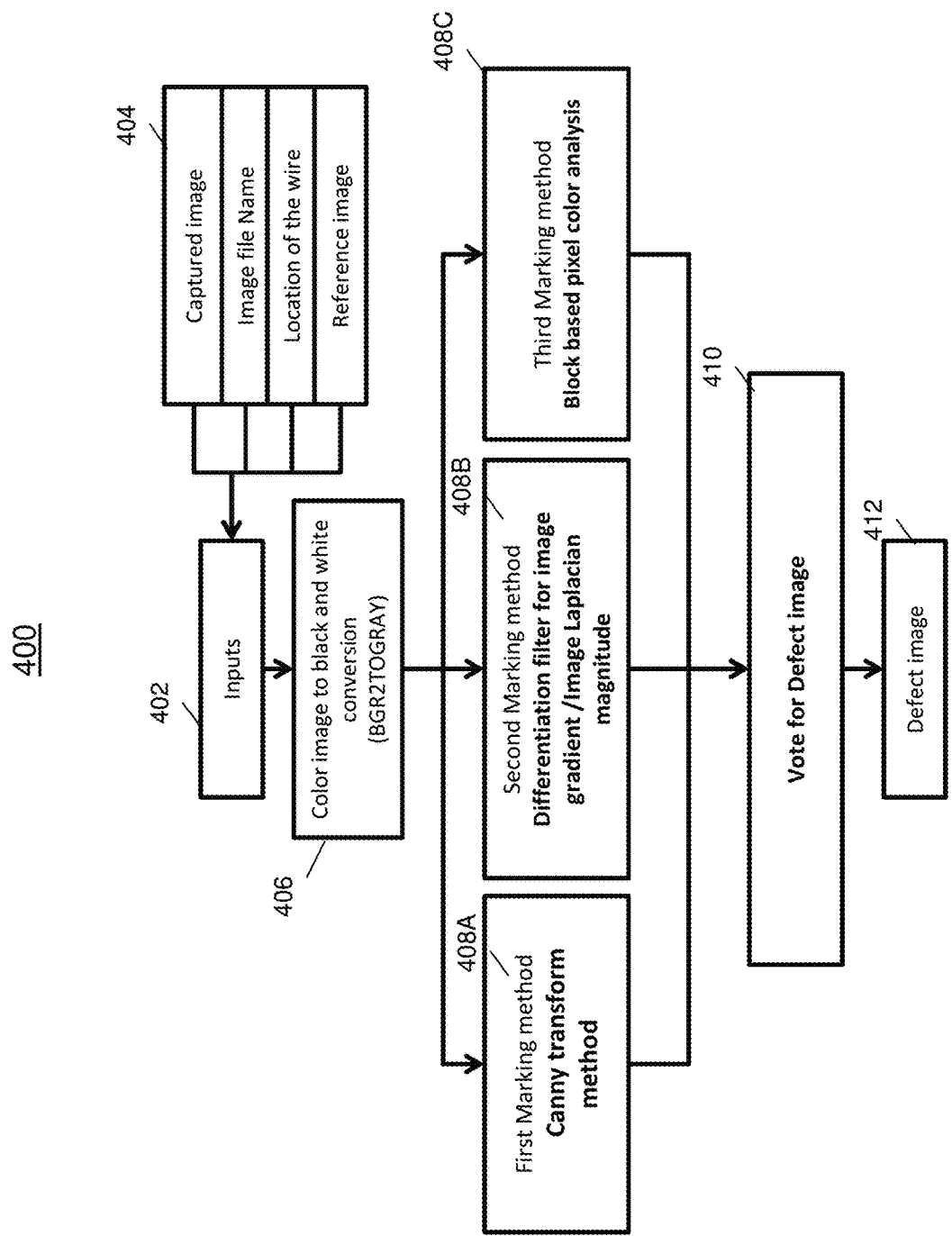
FIG. 4 depicts a process flow for performing automated defect detection for a wire rope using image processing in accordance with one or more embodiments.

Now referring to FIG. 4, a processing flow 400 for processing the image data in accordance with one or more embodiments is shown. As shown, at block 402 several inputs are received at the processing module 112 to perform the automated defect detection for the rope using image processing techniques. In one or more embodiments, the inputs received at block 402 include the set of data 404 including the captured image data, image file name, the location of the rope segment, and reference image data. In one or more embodiments, the system 100 is configured to receive rope segment information from the hoist or rope dispensing system indicates a location of the length of rope that has been dispensed. This information can include the size and number of turns of a drum that is used to dispense the rope. It should be understood that other techniques that can be used. It should be understood that other data can be received and used in the processing of image data. At block 406, image data is converted to black and white for further processing.

A first marking technique 408A utilizes a Canny transform that is used to compare the edges of the rope to the reference image. For example, loose strand information can be obtained using the Canny transform processing. A second marking technique 408B includes a differentiation filter for image gradient/image Laplacian magnitude which is used to compare the current image to the reference image. Each frame can monitor a certain length of the rope and splits the frame into smaller frames/windows for analysis against the reference frame. A third marking technique 408C includes using block-based pixel color analysis to each segment of the rope. During processing, the image of the current rope can be provided as a matrix that is compared to the reference image that is also provided as a matrix. The two matrices can be compared to each other further compared to the tolerances that are allowed by the threshold settings for that particular rope. At block 410, a voting for a defect image of the various marking methods is performed. For example, the marking technique compares the reference image with the actual (defect) image. In addition, the voting process allows for a threshold tolerance for various applications to be used to determine whether the rope is fit for operations or requires repair/replacement. It should be understood that the selection can be selected according to a configurable selection. The resulting defect image 412 can be provided to the operator in a notification and/or further analysis.

Figure 5:
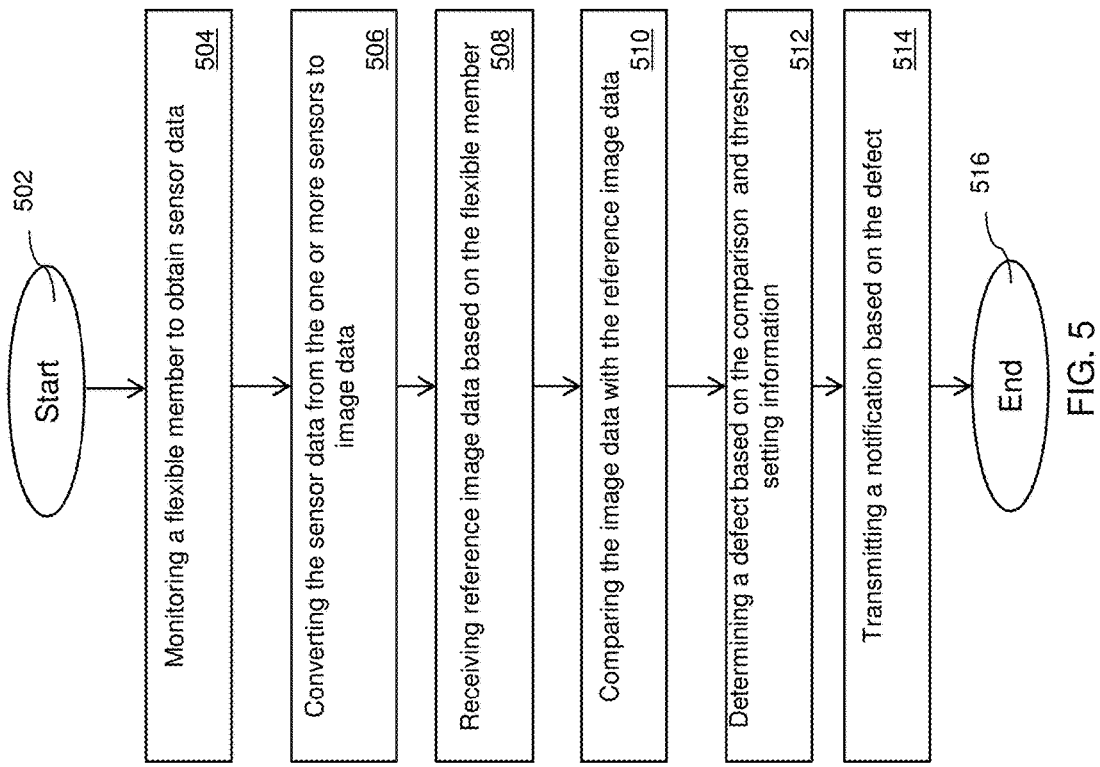
FIG. 5 depicts a flowchart for a method for performing automated defect detection for a wire rope using image processing techniques in accordance with one or more embodiments.

Now referring to FIG. 5, a flowchart of a method 500 for performing automated defect detection for a flexible member using image processing techniques is provided. The method 500 begins at block 502 and proceeds to block 504 which provides for monitoring, by one or more sensors, a flexible member to obtain sensor data. The method 500 continues to block 506 and provides for converting the sensor data from the one or more sensors to image data. Block 508 provides for receiving reference image data and threshold setting information. At block 510, the method 500 provides for comparing the image data with the reference image data. Block 512 provides for determining a defect based on the comparison and the threshold setting information. The method at block 514 provides for transmitting a notification based on the defect. The method 500 ends at block 516.

The technical effects and benefits include real-time rope health monitoring providing prognostic and diagnostic solutions. Therefore there is an increased reliability of the system due to onboard diagnostics. The technical effect and benefits include a reduced time for manual inspections and increased consistency in reporting rope health. There is also an increase in personnel safety when using wire ropes used for human and cargo applications. The system can be made more intelligent with machine learning techniques that are used to analyze the field service data to accurately identify defects and correlate the defects to the remaining life of the rope.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for performing automated defect detection for a flexible member using image processing, the system comprising:
    a plurality of sensors configured to monitor the flexible member, wherein each of the sensors among the plurality of sensors includes respective optical fibers located in a respective optical port, each of the sensors among the plurality of sensors configured to transmit a respective optical signal from the port toward the flexible member and each of the sensors among the plurality of sensors configured to receive the optical signal reflected from a surface of the flexible member through the respective port, wherein 3 optical fibers and their corresponding optical port are spaced 120 degrees;
    an image processor configured to convert sensor data from the sensors among the plurality of sensors to image data; and
    a processor configured to receive reference image data, compare the image data with the reference image data, determine a defect based on the comparison and a threshold setting information for the flexible member, and transmit a notification based on the defect, wherein the threshold setting information is based on a received application information for the flexible member, wherein the threshold setting information comprises different acceptable thresholds and different tolerances for operation based at least in part on the received application information, wherein the processor is further configured to determine a location of the defect of the flexible member and map the defect to a remaining life of the flexible member based on the received application information.

2. The system of claim 1, wherein the processor is configured to determine the defect further comprises categorizing the defect into one or more classes based at least in part on the defect.

3. The system of claim 1, wherein the flexible member is one of rope, wire, belt, and chain.

4. The system of claim 1, wherein the reference image data is based on the flexible member.

5. The system of claim 1, wherein the notification comprises a location of the defect, a number of defects, a type of defect, or a recommendation for performing a service relating to the flexible member.

6. A method for performing automated defect detection for a flexible member using image processing, the method comprising:
    monitoring, by a plurality of sensors, the flexible member to obtain sensor data, wherein each of the sensors among the plurality of sensors includes respective optical fibers located in a respective optical port, wherein 3 optical fibers and their corresponding optical port are spaced 120 degrees, wherein the monitoring comprises:
        transmitting a respective optical signal from each of the respective port toward the flexible member; and
        receiving, via the respective port included with each of the sensors among the plurality of sensors, each of the optical signals reflected from a surface of the flexible member;
    converting sensor data from the one or more sensors to image data;
    receiving reference image data to compare to the image data;
    determining a defect based on the comparison and threshold setting information for the flexible member, wherein the threshold setting information is based on a received application type for the flexible member, wherein the threshold setting information comprises different acceptable thresholds and different tolerances for operation based at least in part on the received application information;
    determining a location of the defect of the flexible member;
    mapping the defect to a remaining life of the flexible member based on the received application information; and
    transmitting a notification based on the defect.

7. The method of claim 6, wherein determining the defect further comprises categorizing the defect into one or more classes based at least in part on the defect.

8. The method of claim 6, wherein the flexible member is at least one of rope, wire, belt, and chain.

9. The method of claim 6, wherein the reference image data is based on the flexible member.

10. The method of claim 6, wherein the notification comprises a location of the defect, a number of defects, a type of defect, or a recommendation for performing a service relating to the flexible member.

* * * * *